(12) United States Patent
Awad et al.

(10) Patent No.: US 12,238,681 B2
(45) Date of Patent: Feb. 25, 2025

(54) COMMUNICATIONS DEVICE, INFRASTRUCTURE EQUIPMENT AND METHODS FOR TRANSMITTING TRANSPORT BLOCKS WITH SELECTED ENCODING PARAMETERS

(71) Applicant: Sony Group Corporation, Tokyo (JP)

(72) Inventors: Yassin Aden Awad, Basingstoke (GB); Vivek Sharma, Basingstoke (GB); Yuxin Wei, Basingstoke (GB); Shin Horng Wong, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/427,657

(22) PCT Filed: Feb. 12, 2020

(86) PCT No.: PCT/EP2020/053567
§ 371 (c)(1),
(2) Date: Aug. 2, 2021

(87) PCT Pub. No.: WO2020/165231
PCT Pub. Date: Aug. 20, 2020

(65) Prior Publication Data
US 2022/0159621 A1    May 19, 2022

(30) Foreign Application Priority Data

Feb. 14, 2019 (EP) ................................. 19157326

(51) Int. Cl.
*H04W 72/02* (2009.01)
*H04L 5/00* (2006.01)
(Continued)

(52) U.S. Cl.
CPC .......... *H04W 72/02* (2013.01); *H04L 5/0051* (2013.01); *H04W 72/23* (2023.01); *H04W 72/542* (2023.01); *H04W 72/56* (2023.01)

(58) Field of Classification Search
CPC ... H04W 72/02; H04W 72/56; H04W 72/542; H04W 72/23
See application file for complete search history.

(56) References Cited

U.S. PATENT DOCUMENTS

2015/0195074 A1* 7/2015 Eriksson ............... H04L 1/1887
370/252
2017/0034845 A1 2/2017 Liu et al.
(Continued)

FOREIGN PATENT DOCUMENTS

EP      3451766 A1    3/2019
WO   2018/072159 A1  4/2018
(Continued)

OTHER PUBLICATIONS

Samsung, "Discussion on grant-free/contention-based non-orthogonal multiple access", 3GPP TSG RAN WG1 Meeting #86 R1-166752, Aug. 22-26, 2016, Gothenburg, Sweden.
(Continued)

*Primary Examiner* — Won Tae C Kim
(74) *Attorney, Agent, or Firm* — XSENSUS, LLP

(57) ABSTRACT

A method of transmitting uplink data by a communications device in a wireless communications network, the method comprising receiving an indication of first communications resources allocated for a transmission of data by the communications device and associated with encoding parameters, determining that first uplink data is available for transmission, selecting the first communications resources for the transmission of the first uplink data, selecting encoding parameters different from the encoding parameters associated with the first communications resources, forming a
(Continued)

transport block comprising the first uplink data in accordance with the selected encoding parameters, and transmitting, using the first communications resources, the transport block and an indication of the selected encoding parameters.

13 Claims, 13 Drawing Sheets

(51) Int. Cl.
*H04W 72/23* (2023.01)
*H04W 72/542* (2023.01)
*H04W 72/56* (2023.01)

(56) References Cited

U.S. PATENT DOCUMENTS

| | | | | |
|---|---|---|---|---|
| 2020/0229208 | A1* | 7/2020 | Quan | H04W 72/1268 |
| 2021/0328748 | A1* | 10/2021 | Sharma | H04W 72/569 |
| 2021/0337538 | A1* | 10/2021 | Li | H04L 1/1671 |
| 2023/0155748 | A1* | 5/2023 | Lee | H04L 1/1819 370/329 |

FOREIGN PATENT DOCUMENTS

| | | | |
|---|---|---|---|
| WO | 2018/172382 | A1 | 9/2018 |
| WO | 2018/210493 | A1 | 11/2018 |
| WO | 2020/064220 | A1 | 4/2020 |
| WO | 2020/064438 | A1 | 4/2020 |
| WO | 2020/127529 | A1 | 6/2020 |

OTHER PUBLICATIONS

International Search Report and Written Opinion mailed on Jun. 25, 2020, received for PCT Application PCT/EP2020/053567, Filed on Feb. 12, 2020, 14 pages.
3GPP, "Study on NR Industrial Internet of Things (IOT); Release 16" 3GPP TR 38.825 V0.0.1, Nov. 2018, pp. 1-12.
3GPP, Study on Physical Layer Enhancements for NR Ultra-Reliable and Low Latency Case (URLLC) (Release 16), 3GPP TR 38.824 V1.0.0, Nov. 2018, pp. 1-22.
3GPP, "LS on Intra-UE Prioritization/Multiplexing", 3GPP TSG-RAN WG2 Meeting #104, R2-1818795, Nov. 12-16, 2018, 2 pages.
3GPP, "LS on Multiple Active Configured Grant Configurations", 3GPP TSG RAN WG2#104, R2-1818991, Nov. 12-16, 2018, 1 page.
3GPP, "NR; Physical Layer Procedures for Data (Release 15)", 3GPP TS 38.214 V15.3.0, Sep. 2018, pp. 1-96.
3GPP, "NR; Physical Layer Procedures for Data (Release 15)", 3GPP TS 38.214 V15.2.0, Jun. 2018, pp. 1-94.
3GPP, "NR; NR and NG-RAN Overall Description; Stage 2 (Release 15)", 3GPP TS 38.300 V15.2.0, Jun. 2018, pp. 1-87.
Holma et al., "LTE for UMTS OFDMA and SC-FDMA Based Radio Access", John Wiley and Sons, 2009, pp. 25-27.
Nokia, "Revised SID: Study on NR Industrial Internet of Things (IoT)", 3GPP TSG RAN meeting #81, RP-182090, Sep. 10-13, 2018, 5 pages.
3GPP, "NR; Medium Access Control (MAC) Protocol Specification (Release 15)", 3GPP TS 38.321 V15.3.0, Sep. 2018, pp. 1-76.
Huawei et al., "New SID on Physical Layer Enhancements for NR Ultra-Reliable and Low Latency Communication (URLLC)", 3GPP TSG-RAN#81, RP-182089, Sep. 10-13, 2018, 5 pages.

* cited by examiner

MCS table 1

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| ... | | | |
| 27 | 8 | 948 | 7.4063 |
| 28 | 2 | reserved | |
| 29 | 4 | reserved | |
| 30 | 6 | reserved | |
| 31 | 8 | reserved | |

MCS Index Signalled in the DCI ⇧ 1414

MCS Index used for transmission ⇧ 1416

MCS table 2

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| ... | | | |
| 27 | 6 | 719 | 4.2129 |
| 28 | 6 | 772 | 4.5234 |
| 29 | 2 | reserved | |
| 30 | 4 | reserved | |
| 31 | 6 | reserved | |

FIG. 11

COMMUNICATIONS DEVICE, INFRASTRUCTURE EQUIPMENT AND METHODS FOR TRANSMITTING TRANSPORT BLOCKS WITH SELECTED ENCODING PARAMETERS

CROSS-REFERENCE TO RELATED APPLICATIONS

The present application is based on PCT filing PCT/EP2020/053567, filed Feb. 12, 2020, which claims the priority of European patent application no. EP 19157326.0, filed Feb. 14, 2019, the contents of each are hereby incorporated by reference.

BACKGROUND

Field

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

An example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and:

FIG. 11 shows examples of two predetermined tables from which MCS parameters may be selected in accordance with embodiments of the present technique;

DETAILED DESCRIPTION OF THE EMBODIMENTS

Long Term Evolution Advanced Radio Access Technology (4G)

Figure 1:
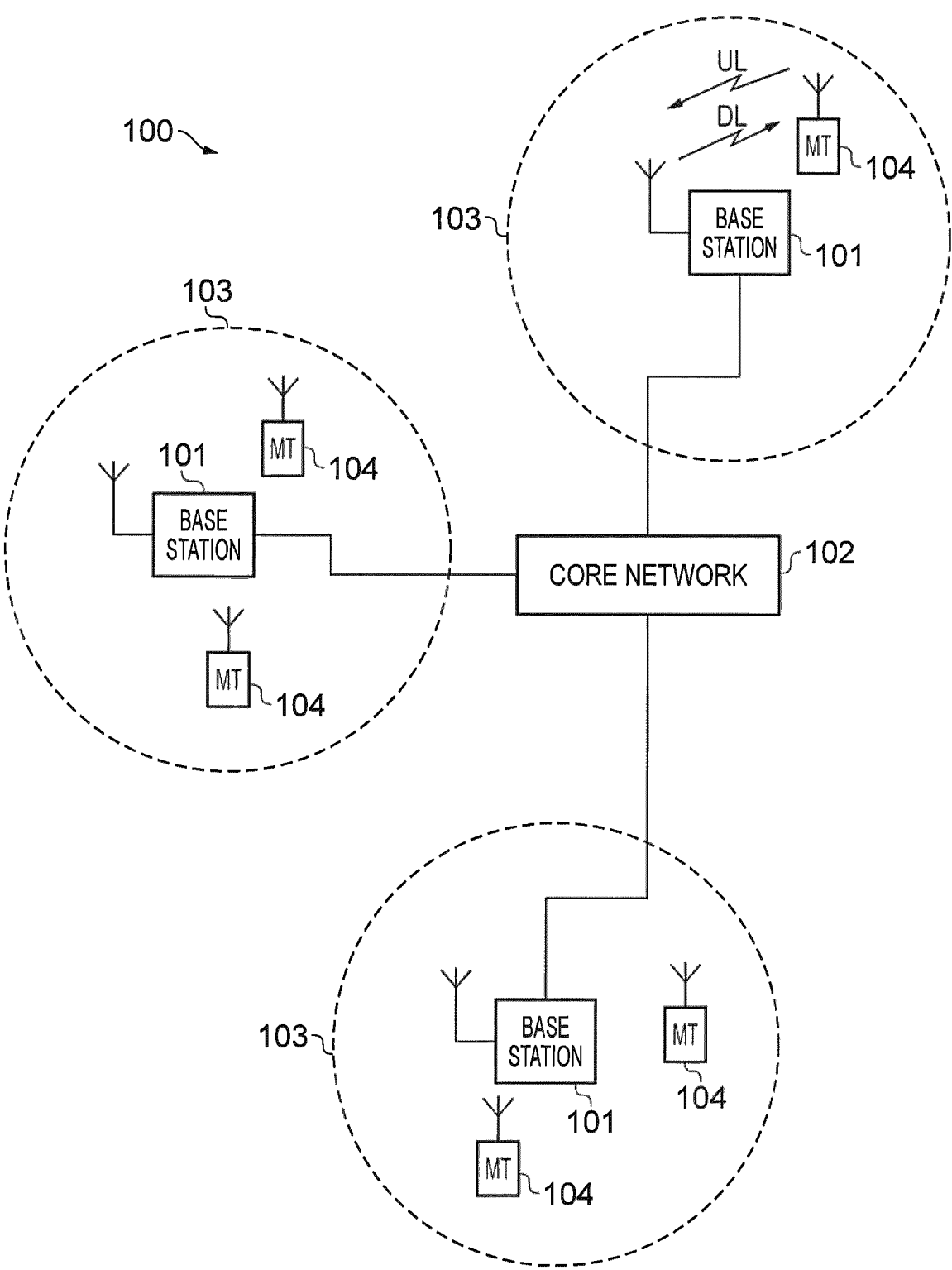
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
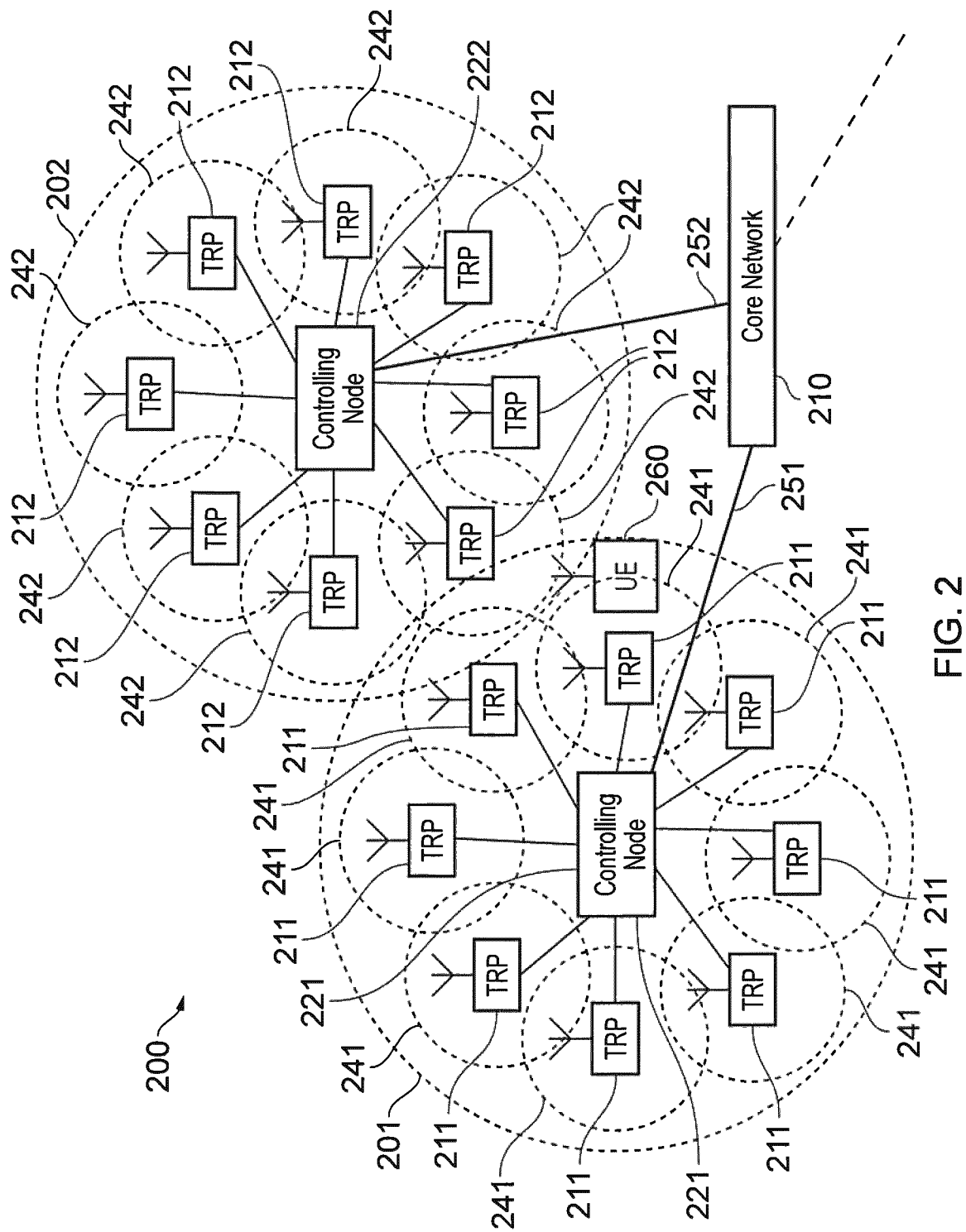
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
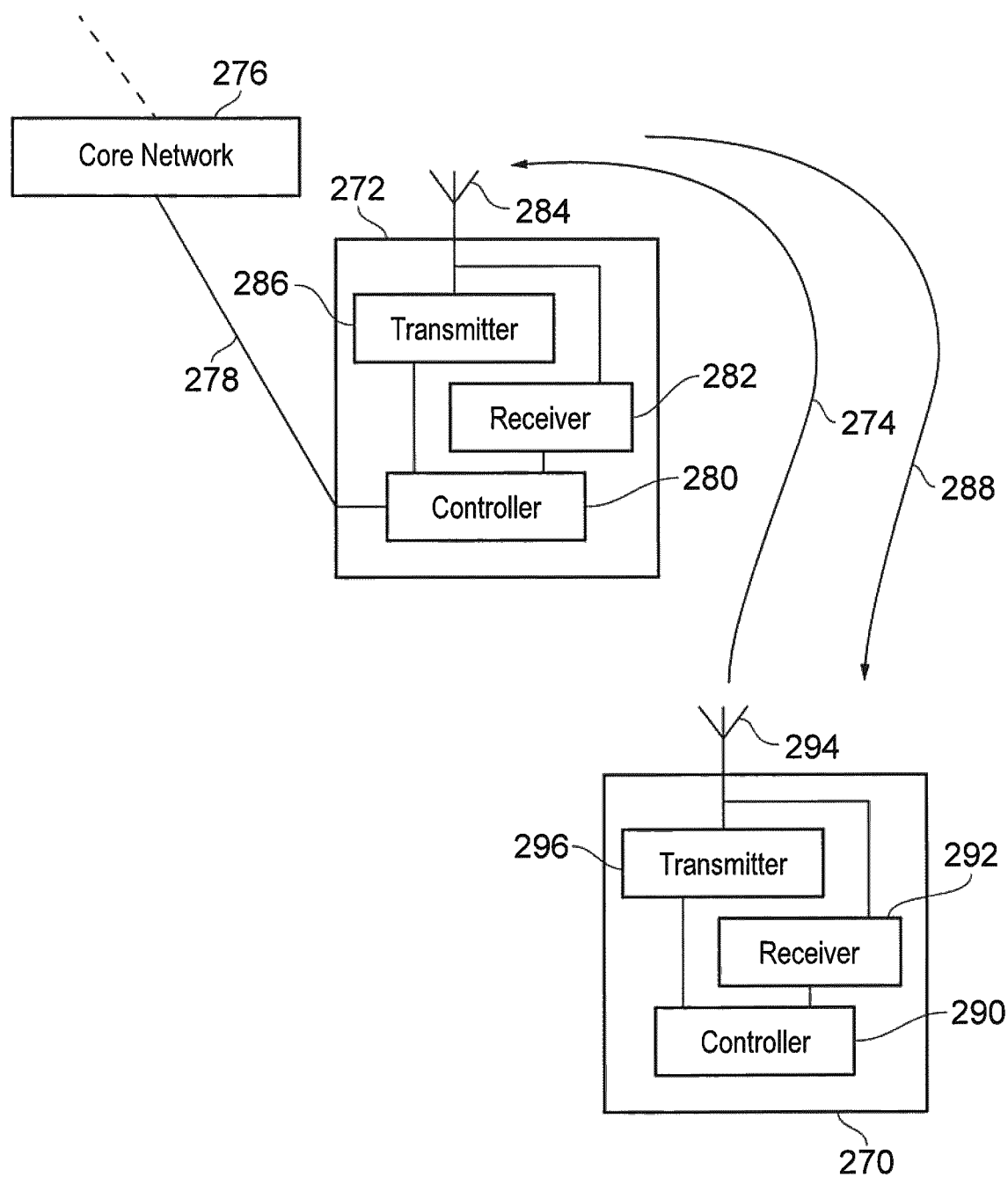
FIG. 3 is a schematic block diagram of an example infrastructure equipment and communications device which may be configured in accordance with example embodiments.
Figure 15:
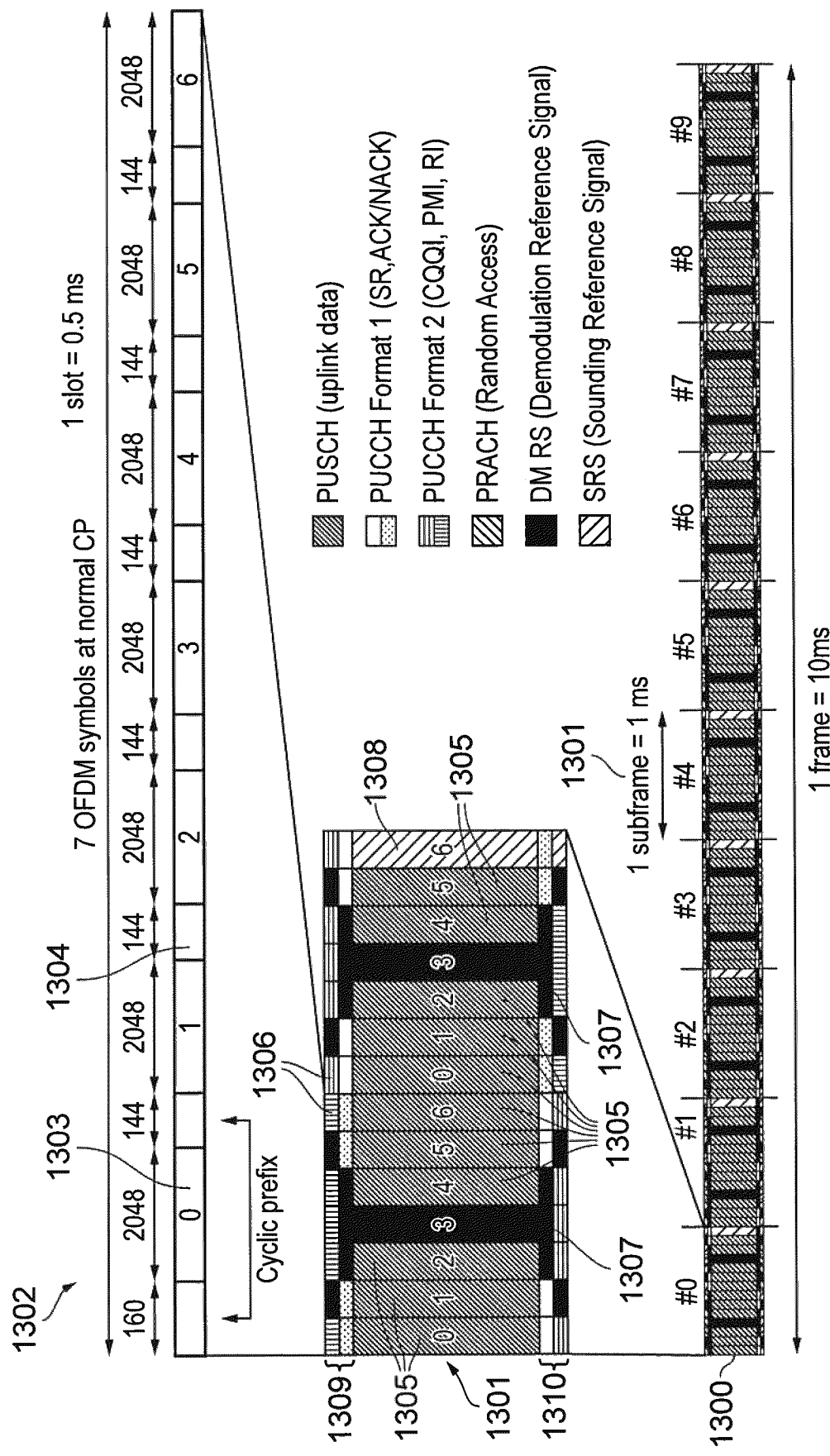
FIG. 15 is a schematic representation of an uplink of a wireless access interface according to the 3GPP LTE standard.

A better appreciation provided by the example embodiments can be gained from reviewing a proposed wireless access interface according to 3GPP LTE/4G and NR/5G. A wireless access interface in accordance with a 3GPP Standard for LTE is described in detail in Annex 1 in which FIG. 15 provides detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

5G, URLLC and Industrial Internet of Things Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [6] services are for a reliability of $1\text{-}10^{-5}$ (99.999%) or higher for one transmission of a 32 byte packet with a user plane latency of 1 ms [3]. In some scenarios, there may be a requirement for a reliability of $1\text{-}10^{-6}$ (99.9999%) or higher with either 0.5 ms or 1 ms of user plane latency. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network.

The UEs in the network may therefore be expected to handle a mixture of different traffic, for example, associated with different applications and potentially different quality of service requirements (such as maximum latency, reliability, packet sizes, throughput). Some messages for transmission may be time sensitive and be associated with strict deadlines and the communications network may therefore be required to provide time sensitive networking (TSN) [10].

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

One of the aspects of URLLC being developed for 5G/NR to support IIoT is a requirement for URLLC to provide a low latency, measured from the ingress of a layer 2 packet to its egress from the network, with a proposed target of 1 ms with a reliability of 99.999%, and later it has been extended to 0.5 ms with a reliability of 99,9999%. This is required in order to support the services for IIoT which require high availability, high reliability, low latency, and in some cases, high-accuracy positioning [1]. Furthermore, one of the requirements for communicating uplink data from a UE is to manage intra-UE packet prioritization and multiplexing. This is a requirement to prioritise the communication of uplink data and control packets from different categories of traffic within the UE. A better appreciation of the generation of uplink data of different logical types will be provided in the following section.

Uplink Logical Channel Prioritization

Figure 4:
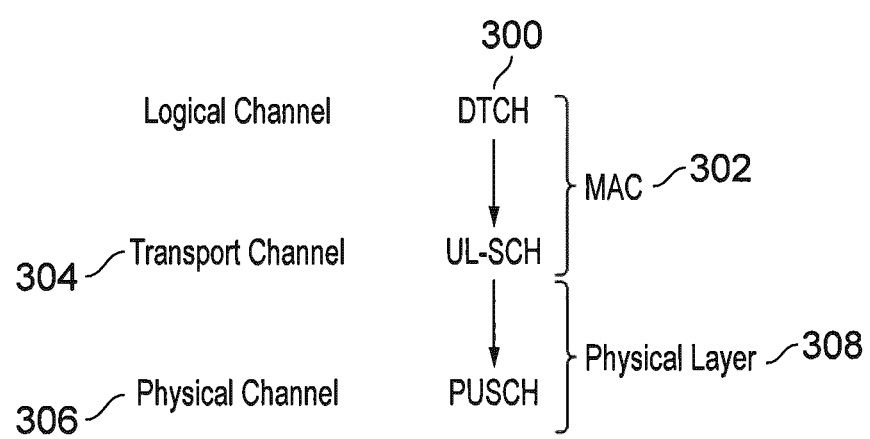
FIG. 4 is a schematic illustration of the processing of data for uplink transmission by a medium access control (MAC) layer and a Physical layer of a communications device or infrastructure equipment, which may be in accordance with embodiments of the present disclosure.

The transmission of uplink data by a communications device to a wireless communications network may be required to support different services, by communicating different types of information and control information. Such data is received from higher layers at a medium access control (MAC) layer. Different types of information are therefore categorized into different Logical Channels. For example MIB or SIB information and user data information are different types of information and therefore they belong to different Logical Channels, namely Broadcast Control Channel (BCCH) and Dedicated Traffic Channel (DTCH) respectively. An illustration is shown in FIG. 4, in which a MAC layer 302 at the UE 270 maps a Logical Channel DTCH 300 to a Transport Channel comprising an Uplink Shared Channel (UL-SCH) 304. As shown in FIG. 4, The UL-SCH Transport Channel 304 is then mapped to a Physical Uplink Shared Channel (PUSCH) 306 within a physical layer 308. The different types of Logical Channels, e.g. BCCH, DTCH, DCCH, have different requirements or priorities and to distinguish them, they are each assigned a different Logical Channel Identity (LCID). Even among data traffic (DTCH) there can be different priorities or requirements and hence multiple DTCH having different priorities may be categorized into different Logical Channels, each having a respective Logical Channel Identity (LCID). Each LCID can be independently configured by the network.

As in LTE, in NR the UE does not decide the number of physical resources it can use to transmit its uplink data but rather, it is the gNB that decides the physical resources, e.g. using a PUSCH, that the UE can use for the transmission of its data. In 3GPP Release-15 NR, the gNB allocates the PUSCH resource to a particular UE for the transmission of data traffic by that particular UE, but does not allocate the resources to a particular logical channel (DTCH) of the UE. That is, the gNB allocates the UE uplink resources for the transmission of a Transport Block (TB) having a Transport Block Size (TBS) which is dependent upon the allocated PUSCH resources (i.e. number of PRBs, OFDM symbols) and a modulation and coding scheme (MCS) with which the TB is to be encoded and transmitted. The PUSCH resources can be dynamically granted to the UE, for example via a downlink control information (DCI). Alternatively, PUSCH resources can be semi-statically configured, in which case the PUSCH resources may be referred to as a configured grant resource.

Since the PUSCH resources are not assigned for the transmission of data for a particular logical channel, a transport block can potentially include data from all (or at least a plurality) of the logical channels. The UE therefore performs a Logical Channel Prioritization function [3] at the MAC layer 302 to decide from which logical channel(s) the data shall be selected to form the TB to be transmitted using the allocated resources. The MAC layer 302 can multiplex data from multiple logical channels into a single TB.

Figure 5:
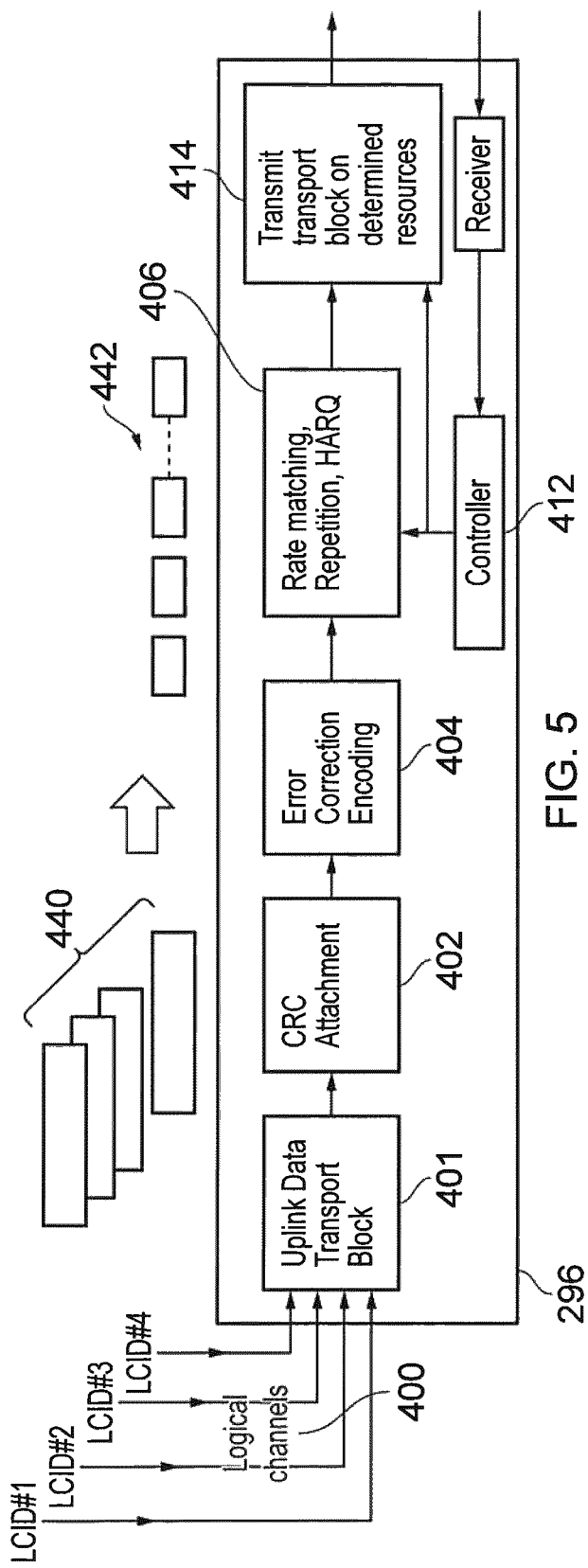
FIG. 5 is a schematic block diagram of an example transmitter which forms uplink data from different logical channels.

An example transmitter which forms uplink data from different logical channels into transport blocks and transmits the data on PUSCH resources is shown in FIG. 5. As shown in FIG. 5, uplink data for transmission from four logical channels each with a different channel identifier LCID #1, LCID #2, LCID #3, LCID #4 is formed in a medium access control layer into transport blocks 440 by an uplink data transport block former 401 forming part of an uplink physical layer by the transmitter 296. The uplink transport blocks 440 are then fed to a CRC Attachment block 402, which calculates a cyclic redundancy check (CRC) for each transport data block before passing the combined CRC parity check bits and data bits to an error correction encoder 404. The error correction encoder 404 encodes the CRC and the data bits of the transport blocks to form error correction encoded transport blocks 442 for transmission on the allocated resources. The error correction encoded transport blocks 442 are then received by a rate matching, repetition and hybrid automatic repeat request (HARQ) block 406. The rate matching, repetition and HARQ block 406 is controlled by a controller 412 to generate encoded data units for transmission by a transmission block 414. The rate matching, repetition and HARQ block 406 is controlled by the controller 412 to form encoded data units from each transport block which may be transmitted repeatedly to improve a likelihood of receiving the uplink data correctly accordingly to a conventional technique. The rate matching, repetition and HARQ block 406 may be also controlled to use a hybrid automatic repeat request process to transmit the transport blocks based on whether a CRC check is determined to be correct at the receiver.

Thus the transmitter 296 may perform the functions of the MAC layer 302 and the Physical layer 308 shown in FIG. 4.

Figure 6:
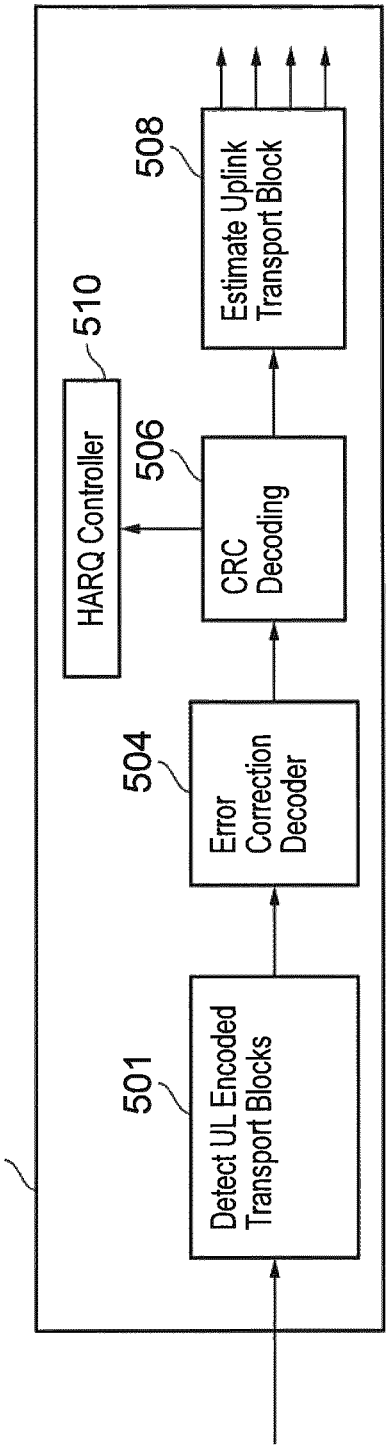
FIG. 6 is a schematic block diagram of an example receiver which receives uplink data associated with different logical channels.

A schematic block diagram of the receiver 282 of the infrastructure equipment 272 for detecting radio signals transmitted from the UE 270 and for decoding the encoded transport block represent by the radio signals is shown in FIG. 6 for completeness. As shown in FIG. 6 a detection block 501 detects the encoded units of data transmitted from the UE 270. As explained, the encoded data units making up each encoded transport block may be transmitted using a HARQ scheme in which the same encoded data unit may be transmitted repeatedly in the allocated uplink resources. Therefore after detecting the encoded data units the encoded transport blocks are reassembled from the encoded data units and the encoded transport blocks fed to an error correction decoder 504. The error correction decoder 504 decodes the encoded transport block and generates an estimate of the data in accordance with the error correction encoding scheme being used at the transmitter. A CRC decoder 506 performs CRC in accordance with a conventional arrangement to detect whether the uplink data in the transport block has been correctly received which outputs the uplink data to a processing block 508.

The uplink data from different logical channels is therefore transmitted in transport blocks via the physical layer. However as mentioned above, once the transport blocks are formed, there is currently limited differentiation with respect to a priority with which the data is transmitted.

Grant Based and Grant Free Allocations

According to conventional techniques for uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. If the communications device already has some communications resources allocated for uplink transmission, it may additionally or alternatively transmit a buffer status report (BSR), indicating an amount of data in the MAC layer buffer(s). In response to receiving the SR or BSR, the network (for example, the infrastructure equipment) may send an Uplink Grant carried by downlink control information (DCI) to the communications device. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). This type of resource allocation is known as grant based (GB) resource, and the allocation may be referred to as a 'dynamic grant' (DG). Grant based resources are suitable for services where the data arrives in variable amounts, and/or is aperiodic, even if such the data traffic arrival follows a somewhat predictable traffic pattern. DGs may be signalled by the gNB at the physical layer, for example, by means of downlink control information (DCI).

On the other hand, grant free resources are a set of periodically repeating uplink communications resources which are semi-statically configured by the network for the use of the communications device for uplink transmission. Such resources may also be referred to as a 'configured grant' (CG). Grant free resource allocation (which may also be referred to as 'semi-persistent scheduling' (SPS)) is particularly suitable for services that generate periodic data traffic, where the amount generated is broadly constant over time. CGs may be signalled at a radio resource control (RRC) layer.

Grant free resources can improve the efficiency with which communications resources are used, since there is no need for either a SR or uplink grant to be transmitted in respect of each uplink data transmission.

Multiple configured grants may be active for a communications device within a given bandwidth part (BWP) of a serving cell, in particular to support different services, traffic types and/or for enhancing reliability and reducing latency [11].

Communications resources may thus be configured for a communications device in accordance with quality of service requirements associated with particular services. Where a single communications device generates data for transmission which comprises data associated with different quality of service requirements, for example because it is associated with different services, the communications device may be configured with multiple resource grants. These multiple resource grants may comprise zero, one or more dynamic grants, and zero, one or more configured grants.

Allocated communications resources may be those which are selected for the transmission of data by the communications device. In the case of a dynamic grant, the communications resources indicated by the dynamic grant are allocated for the communications device. In the case of configured grants, the communications device may select (i.e. allocate) one or more instances of the communications resources corresponding to the configured grant for a transmission by the communications device.

A communications device may thus have multiple active grants. Communications resources configured by these grants may in some instances coincide, for example in the time domain, the frequency domain, or both.

In our co-pending application EP 18197373.6 [4], which is hereby incorporated by reference in its entirety, there is described a method of transmitting data comprising forming a transport block, wherein the size of the transport block is selected from a plurality of possible transport block size (TBS) values.

The inventors have identified a need to improve conventional techniques for the transmission of data to meet the requirements associated with difference services, such as for example URLLC and eMBB, where requirements of the traffic associated with the services may differ.

According to embodiments of the present disclosure, there is provided a method of transmitting uplink data by a communications device in a wireless communications network, the method comprising receiving an indication of first communications resources allocated for a transmission of data by the communications device and associated with encoding parameters, determining that first uplink data is available for transmission, selecting the first communications resources for the transmission of the first uplink data, selecting encoding parameters different from the encoding parameters associated with the first communications resources, forming a transport block comprising the first uplink data in accordance with the selected encoding parameters, and transmitting, using the first communications resources, the transport block and an indication of the selected encoding parameters.

In some embodiments of the present technique, an indication of selected encoding parameters is transmitted to the infrastructure equipment, permitted the infrastructure equipment to determine the encoding parameters with which the uplink data has been encoded.

MAC Transport Block

Data may be transmitted by the communications device 104 using uplink communications resources using MAC transport blocks (TB). Each MAC TB is constructed at the MAC protocol layer 302 in response to determining that uplink communications resources are, or will be, scheduled for the communications device and that data is available for uplink transmission.

Conventionally, a MAC TB may be formed using 'highest priority first' scheduling. That is, data associated with logical channels having the highest priority is added to the MAC TB in preference to data associated with logical channels having lower priorities. In order to provide some fairness in the scheduling, each logical channel may be associated with 'bucket' parameters, according to which a form of bucket scheduling is applied. That is, each logical channel may be subject to maximum throughput constraints, which may permit a high throughput over a short period of time, while limiting a long-term throughput; alternatively, the throughput constraints may limit throughput over a short term while allowing high throughput over a longer time period.

Hybrid Automatic Repeat Request (HARQ) Feedback

In accordance with conventional techniques, the communications device 104 may receive downlink data from the infrastructure equipment 101. In order to indicate whether the downlink data was received correctly or not, the communications device 104 may transmit HARQ feedback within uplink PUSCH communications resources which are allocated for the transmission by the communications device 104 of uplink data.

HARQ feedback is encoded independently of the uplink data so that the infrastructure equipment 101 is able to decode the HARQ feedback, and thus determine whether previous downlink data was correctly received or not, independently of whether the uplink data was successfully decoded.

HARQ feedback information is transmitted within predetermined communications resources of the PUSCH. An example of such reserved resources is shown in FIG. 7.

Figure 7:
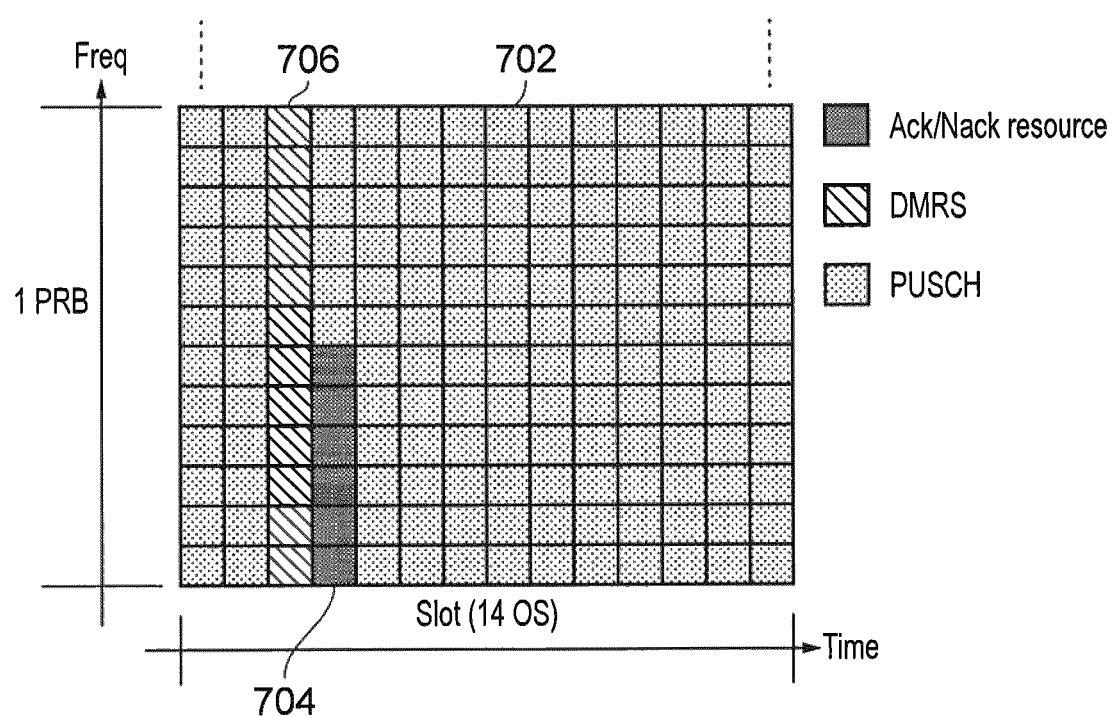
FIG. 7 illustrates a use of a portion of uplink communications resources of a wireless access interface which have been allocated for uplink transmission by a communications device in accordance with conventional techniques.

FIG. 7 shows a use of a portion of uplink communications resources of the wireless access interface which have been allocated for uplink transmission by the communications device 104 in accordance with conventional techniques.

FIG. 7 shows 12 subcarriers (i.e. one physical resource block) in the frequency domain and one timeslot, comprising 14 OFDM symbols, in the time domain. Each small portion of the grid therefore corresponds to one resource element 702. Six resource elements 704 are reserved for HARQ feedback, and a further 12 resource elements 706 are reserved for DMRS (see Annex 1). The remaining resource elements are available for PUSCH transmission of uplink data.

The number of HARQ-ACK bits before channel coding scheme, in an example, 2 bits, for acknowledging the reception status of two transport blocks (2 TBs) previously transmitted in the downlink, for example of PDSCH. It will be appreciated that the number of HARQ-ACK bits depends on the number of previous PDSCH transmissions that need to be acknowledged and it can be greater or smaller than two. The modulation scheme used for the HARQ-ACK bits after channel coding is same as modulation scheme used for PUSCH transmission.

In accordance with embodiments of the present technique, the communications device 104 uses a predetermined subset of resource elements to transmit an indication of encoding parameters (such as a modulation and coding scheme, MCS) used for the encoding of the uplink data transmitted on the PUSCH resources.

In some embodiments, this MCS indication is transmitted whenever there is a collision between a dynamic grant and a configured grant.

The predetermined resources used for the transmission of the MCS indication may, in some embodiments, vary according to whether or not HARQ feedback is also to be transmitted within the same PRB.

Figure 8:
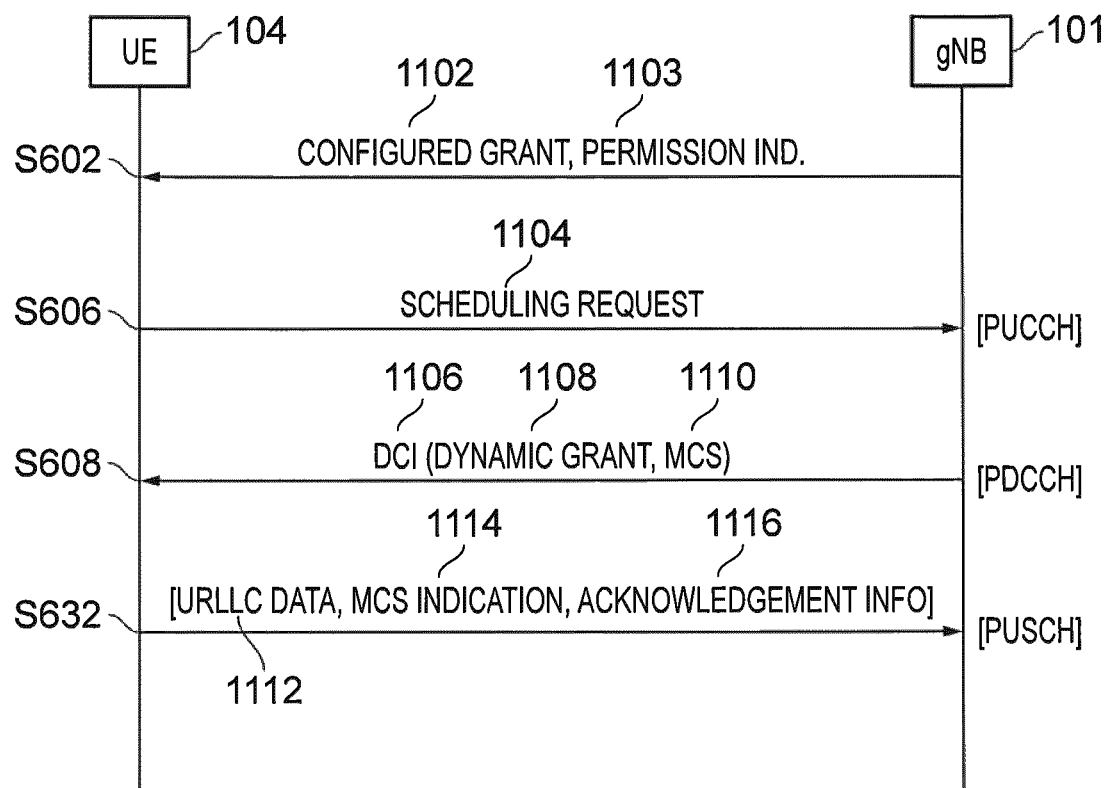
FIG. 8 is a message sequence chart illustrating aspects of processes of a communications device and an infrastructure equipment in accordance with embodiments of the present technique.

FIG. 8 is a message sequence chart illustrating aspects of the processes of the communications device 104 and the infrastructure equipment 101 in accordance with embodiments of the present technique. The communications device 104 may broadly correspond to the UE 260 of FIG. 2 or the communications device 270 of FIG. 3.

The gNB/infrastructure equipment 101 may broadly correspond to the infrastructure equipment 272 of FIG. 3.

Steps corresponding to those illustrated in FIG. 12 and described below are labelled with the same references.

The first transmission in the sequence is the transmission of a configured grant indication 1102 at step S602, which may be within RRC signalling transmitted from the infrastructure equipment 101 to the communications device 104. In some embodiments, this, or other RRC signalling, may include a permission indication 1103, indicating whether the communications device 104 is permitted to select encoding parameters such as a modulation and coding scheme, for transmission of data on PUSCH resources allocated by means of a dynamic grant, which differ from the encoding parameters indicated as associated with the dynamic grant.

In some embodiments, the determination at step S620 of the process illustrated in FIG. 12 and described below may be based on the permission indication 1103.

Subsequently, at step S606, the communications device 101 transmits on the PUCCH a scheduling request 1104, requesting resources for the uplink transmission of data, such as eMBB data.

In response to the scheduling request 1104, the infrastructure equipment allocates uplink communications resources on the PUSCH, by means of a dynamic grant within downlink control information (DCI) 1106 transmitted on the PDCCH. The DCI 1106 comprises a dynamic grant indication 1108 and an MCS indication 1110 which indicates encoding parameters to be used for the transmission of data on the resources allocated by the dynamic grant.

In some embodiments, the MCS indication 1110 may indicate explicitly or implicitly a plurality of encoding parameters, from which the communications device 104 may select (for example, at step S622) encoding parameters for the uplink transmission of data on the allocated resources.

Subsequently, at step S632, the communications device 104 transmits, using the PUSCH communications resources indicated in the dynamic grant 1108, data 1112 (which may be URLLC data or other data different from that which triggered the scheduling request 1104), an MCS indication 1114 which indicates the selected encoding parameters, and, depending on the determination at step S626 of the process of FIG. 12, acknowledgement information 1116.

Figure 9:
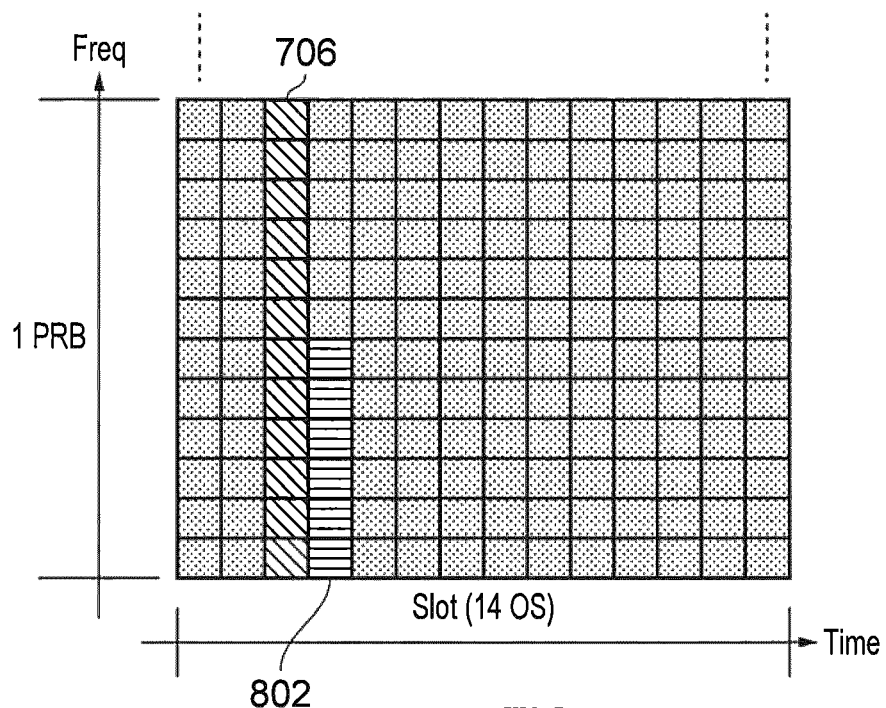
FIG. 9 illustrates a use of a portion of uplink communications resources in accordance with embodiments of the present technique, where no acknowledgement information is transmitted within the communications resources.

FIG. 9 illustrates a usage of a portion of uplink communications resources of the wireless access interface which have been allocated for uplink transmission by the communications device 104 in accordance with embodiments of the present technique, where no acknowledgement information (e.g. HARQ feedback) 1116 is transmitted within the same PRB.

As in FIG. 7, twelve resource elements 706 are reserved for the transmission of DMRS. In addition, six resource elements 802 are reserved for the transmission of one or two bits of the MCS indication 1114.

In some embodiments, the MCS indication 1114 and HARQ feedback 1116 may be jointly encoded. For example, in FIG. 9, the resource elements 802 may be used to jointly transmit one bit of HARQ feedback information 1116 together with one bit of MCS indication 1114.

Figure 10:
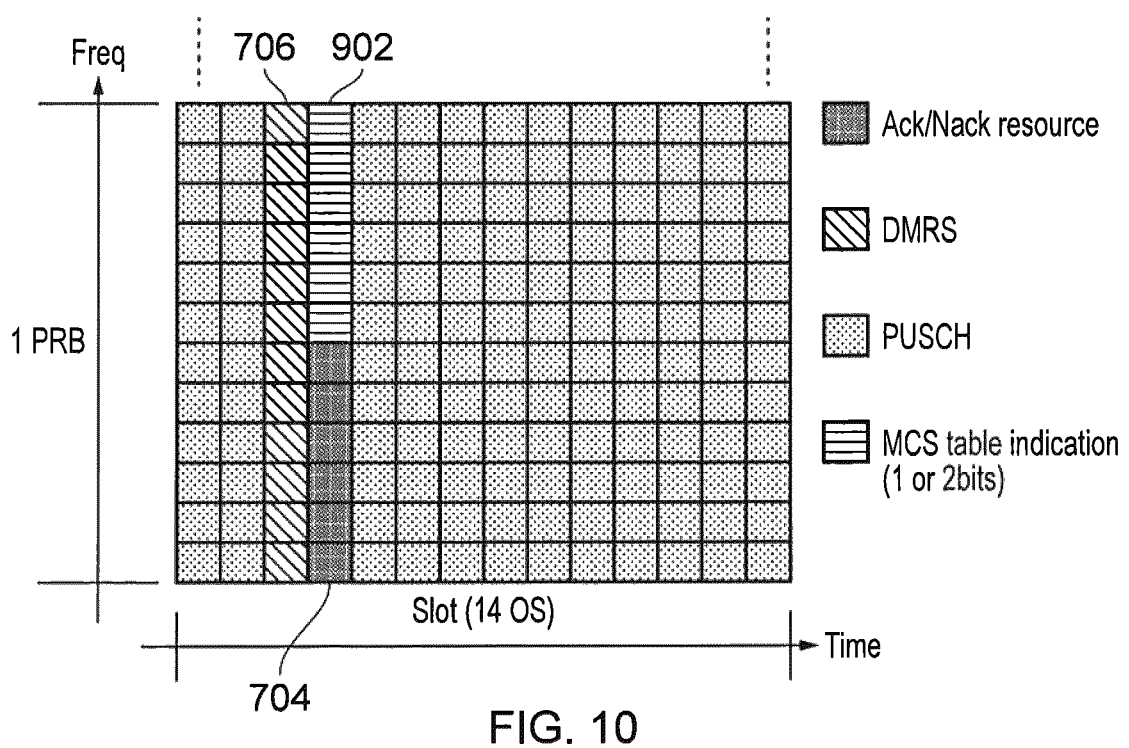
FIG. 10 illustrates a use of a portion of uplink communications resources in accordance with embodiments of the present technique, where acknowledgement information is transmitted within the communications resources.

FIG. 10 illustrates a usage of a portion of uplink communications resources of the wireless access interface which have been allocated for uplink transmission by the communications device 104 in accordance with embodiments of the present technique, where HARQ feedback 1116 is transmitted within the same PRB.

As in FIG. 7, twelve resource elements 706 are reserved for the transmission of DMRS and six resource elements 704 are reserved for the transmission of one or two bits of HARQ feedback 1116.

In addition, six resource elements 902 are reserved for the transmission of one or two bits of MCS indication 1114.

In accordance with embodiments of the present technique, the transmission of the HARQ feedback 1116 is in accordance with a predetermined scheduling algorithm known to both the communications device 104 and the infrastructure equipment 101. Thus, the infrastructure equipment 101 receiving the uplink transmissions in the communications resources as shown in FIG. 7, FIG. 9 and/or FIG. 10 determines whether or not (and if so, how much) HARQ feedback information 1116 is scheduled to be transmitted, and thus determines which resource elements are reserved (if any) for HARQ feedback 1116 and which for the MCS indication 1114.

In some embodiments, the MCS indication 1114 is transmitted only when there is a collision between DG resources and CG resources, both allocated for the transmission of uplink data by the communications device 104. In such embodiments, since the infrastructure equipment 101 is responsible for scheduling the DG and CG resources, it determines whether such a collision has arisen, and thus whether the MCS indication 1114 is transmitted within the reserved resource elements.

In other words, both the communications device 104 and the infrastructure equipment 101 determine which, if any resource elements are reserved for the HARQ feedback 1116, and which, if any, resource elements are reserved for the MCS indication 1114, based on the same considerations.

Preferably, the set of resource elements 802 reserved for the transmission of the MCS indication 1114 in the case where no HARQ feedback 1116 is transmitted is the same as the set of resource elements 704 reserved for the transmission of HARQ feedback 1116 where HARQ feedback 1116 is transmitted. In some embodiments, the HARQ feedback 1116 is transmitted within the same set of reserved resource elements 704 irrespective of whether the MCS indication 1114 is also transmitted. In some such embodiments, the MCS indication 1114 may be jointly coded together with the HARQ feedback 1116.

In some embodiments, the modulation scheme used for the transmission of the MCS indication 1114 may be predetermined and known to both the communications device 104 and the infrastructure equipment 101. For example, the modulation scheme may be fixed to quadrature phase shift keying (QPSK) modulation scheme. In some embodiments, the modulation scheme for the MCS indication 1114 may be selected independently of the modulation scheme used for the other PUSCH resource elements.

In some embodiments, the MCS indication 1114 is transmitted when one or more of the following conditions are satisfied:
1) There is a collision between communications resources of dynamic and configured grants; and
2) There is a PUSCH transmission; and
3) There is an uplink transmission on resources allocated by a dynamic grant.

Thus in some embodiments, the MCS indication 1114 may be transmitted even if there is no collision. This may permit the communications device 104 to indicate a selected MCS independently of any scheduling collision, and thus may adapt the MCS for reasons that may not be otherwise apparent to the infrastructure equipment 101, for example because of an immediate availability of URLLC data in its buffer, or a sudden change of a channel condition.

MCS Selection

Conventionally, the MCS to be used for uplink transmission on PUSCH, where the PUSCH resources are scheduled by a DG, is indicated by the infrastructure within the downlink control information 1106 comprising the DG indication 1108.

However, as explained in our co-pending application EP 18197373.6 [4], it may be beneficial for the communications device 104 to adapt the indicated MCS, that is, to use an MCS other than that indicated in the DCI 1106. This may be particularly beneficial when the PUSCH resources are to be used for transmitting URLLC data 1112, which may be characterised by a requirement for a high reliability of successful transmission. Furthermore the URLLC data 1112 may be comprise only a relatively small amount of data, relative to the extent of the DG communications resources. As such, it may be possible to transmit all of the URLLC data 1112 within the DG communications resources, even using a much more reliable MCS than that indicated by the grant.

In some embodiments of the present technique the PHY protocol entity 308 indicates to the MAC protocol entity 302 a plurality of permitted TBS values which may be selected by the MAC protocol entity 302 for forming the TB to be transmitted using the DG resources. In some embodiments the set of permitted TBS values may be implicitly indicated in the DCI 1106. Alternatively the set of permitted TBS values may be explicitly signalled in the DCI 1106. In some embodiments the permitted TBS values are indicated in a manner similar to that used for early data transmission (EDT) using message 3 in the 3GPP Release 15 efe-MTC.

In some embodiments at least two tables are preconfigured in the communications device 104 and the infrastructure equipment 101, for example in accordance with standards specifications. Preferably each table indicates, for each of a plurality of row index numbers, either a corresponding transport block size (TBS) value, or modulation and coding scheme (MCS) parameters by which the TBS value may be determined. A row number from one table may be indicated by the infrastructure equipment, for example as part of the DG indication. The MAC protocol entity 302 may be permitted to select a TBS value from a different preconfigured table having the same indicated row number.

Preferably, the number of tables from which the TBS value or MCS parameters may be selected is a power of two (e.g. 2, 4, 8). More preferably, the number of tables from which the TBS value or MCS parameters may be selected is two.

FIG. 11 shows examples of two predetermined tables 1402, 1404 from which the MCS parameters may be selected in accordance with embodiments of the present technique.

A first table 1402 comprises an indication of a modulation order 1412, a target code rate 1406 and a resulting spectral efficiency 1408 for each of a plurality of index values 1410.

The DCI 1106 may comprise as the MCS indication 1110 an indication of one of the index values 1410. In the example illustrated in FIG. 11, the MCS indication 1110 comprises an indication of index value 4, as indicated by the arrow 1414. Thus, the encoding parameters associated with the communications resources allocated by the dynamic grant 1108 are those corresponding to the index value 4, within the first table 1408.

The plurality of permitted encoding values are thus those encoding values corresponding to an index value of 4 within either the first table 1402 or a second table 1404.

In the example of FIG. 11, the index values of the permitted MCS parameters are the same. In some embodiments, the index value(s) of the permitted MCS parameters may be associated in a predetermined manner. For example, if the index value of the indicated MCS indication 1110 is x, then the MCS parameters associated with index value x+C in the second table 1404, where C is a predetermined (e.g. configured by RRC configuration) parameter. Thus, in the example of FIG. 11, the value of C may be zero.

It will be apparent that based on the extent of the communications resources allocated by the DG 1108 and the plurality of permitted encoding parameters, the plurality of permitted TBS values may be derived.

In the example shown in FIG. 11, the communications device 104 selects as the encoding parameters those associated with the index value 4 from the second table 1404, as indicated by the arrow 1416.

In some embodiments, the MCS indication 1114 may comprise an indication of which of the predetermined tables the selected encoding parameters have been selected (subject to the constraint that they must be selected from a row having an index value equal to that indicated in the DCI 1106). In the example of FIG. 11, therefore, the MCS indication 1114 may comprise an indication that the encoding parameters are selected from the second table 1404.

The MCS indication 1114 thus indicates which of the plurality of permitted TBS values (or equivalently, which MCS parameters) have been selected.

When receiving the MAC TB, the infrastructure equipment 101 first decodes the MCS indication 1114 and then, based on the MCS indication 1114, determines the MCS parameters used for the PUSCH transmission of the TB.

In some embodiments, the MAC protocol entity 850 is configured with two tables of coding parameters, one for low reliability and another for high reliability, such as the tables 1402, 1404 of FIG. 11. Each table may provide parameters which permit a TBS value to be determined for each row of the table. The low reliability parameters may be appropriate for the eMBB service, for example. When the infrastructure equipment 101 sends the uplink grant or DCI to the communications device 104, a table row number may be indicated for the low reliability coding parameters table.

When the communications device 104 receives the grant, it determines that there is high reliability data (e.g. URLLC data) in the buffer and, based on this determination, selects a TBS value corresponding to the coding parameters indicated in the high reliability table, using the same table row number as indicated in the grant or DCI.

For example, the tables may comprise the tables defined for a physical uplink shared channel (PUSCH) as specified in 3GPP TS 38.214 [5], and the row number may be indicated by an MCS Index ($I_{MCS}$) parameter. The tables may indicate, for each MCS Index, a modulation order and target code rate. Based on the modulation order, target code rate and determined allocated uplink communications resources, the corresponding TBS value may be determined.

Once the MAC TB has been passed to the PHY protocol entity 308 then the PHY protocol entity 308 transmits on the wireless access interface signals representing the MAC TB using the uplink communications resources allocated for the uplink transmission.

In some embodiments, the infrastructure equipment 101 can configure, for example via RRC control signalling, whether the communications device 104 is allowed to switch MCS table and transmit the MCS indication 1114 using the PUSCH resources.

In some embodiments, the infrastructure equipment 101 signals in the downlink grant (e.g. by means of 1 bit in the DCI 1106) to the communications device 101 that the communications device 101 is required to transmit the MCS indication 1114. The 1-bit in the DCI could be a new bit or an existing bit adapted for this purpose.

Figure 12:
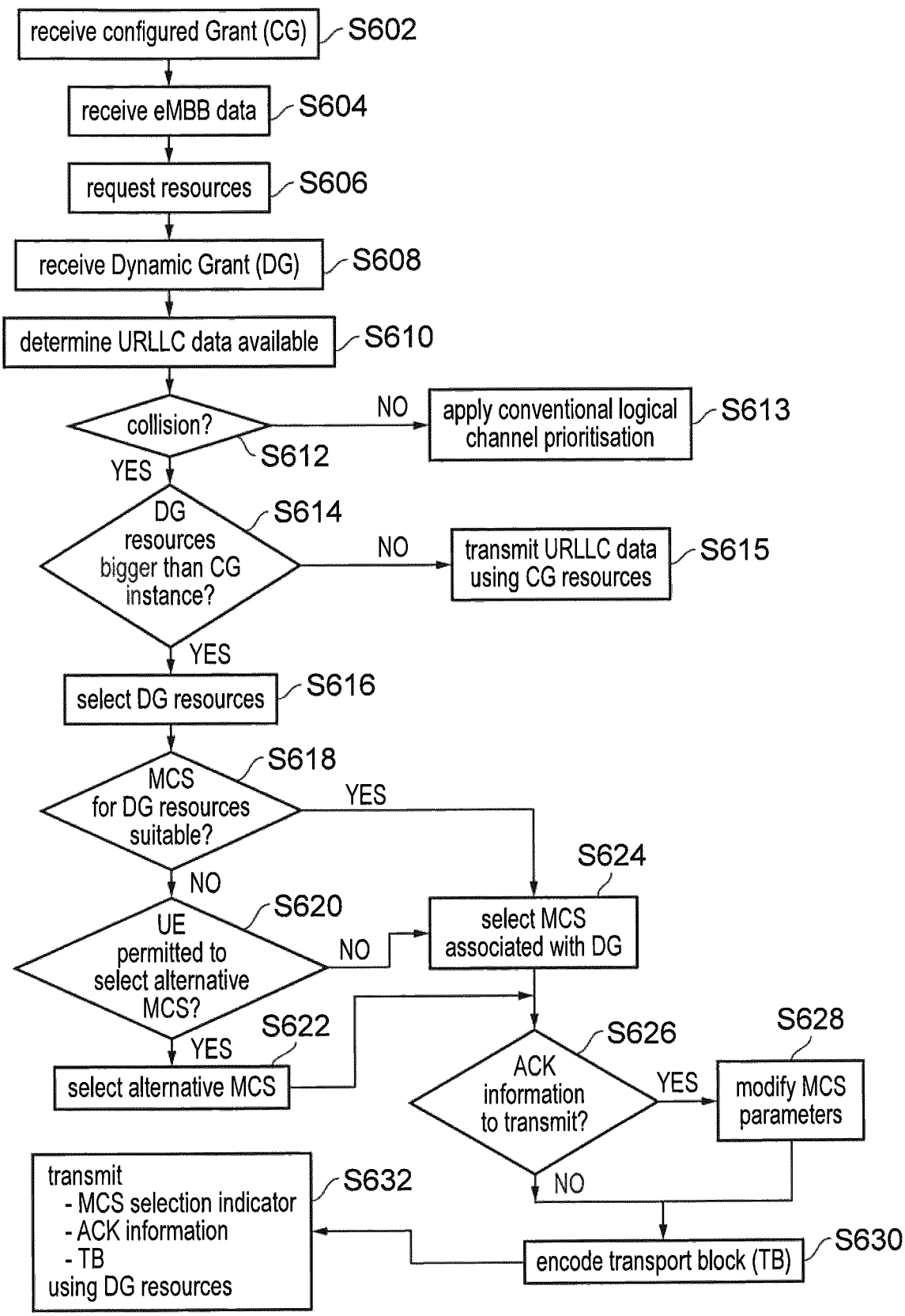
FIG. 12 illustrates a flow chart for a process for the transmission of uplink data in accordance with embodiments of the present technique.

FIG. 12 illustrates a flow chart for a process for the transmission of uplink data in accordance with embodiments of the present technique.

Steps corresponding to those illustrated in FIG. 8 and described above are labelled with the same references.

The process starts at S602, in which the communication device 104 receives an indication 1102 of a configured grant, from the infrastructure equipment 101. The configured grant (CG) may provide communication resources which are periodic, each instance of which may be relatively small, in terms of the quantity of communications resources. For example, the configured grant may provide 14 resource elements (two PRBs for 7 OFDM symbols) every 2 milliseconds, i.e. within alternate 1 millisecond time slots.

The communication resources allocated by the configured grant may be associated with a logical channel which has an associated logical channel priority which is relatively high such as a logical channel identity associated with the URLLC service.

The communication resources allocated by the configured grant may thus be suitable for the transmission of small quantities of data which has a strict latency requirement. Because the resources are configured in advance, it is possible to for the communications device 104 to transmit data using the resources of the configured grant without an explicit request being transmitted by the communications device 104 to the infrastructure equipment 101 in response to determining that uplink data associated with the URLLC service is available for transmission.

Subsequently at step S604 the communications device 104 may receive eMBB data for transmission, or may otherwise determine that eMBB data is available for transmission. For example at the MAC protocol entity 302 of the communications device 104, there may be received an indication from upper layers that eMBB data is available for transmission. The eMBB data may be associated with a logical channel having a lower logical channel priority than that associated with the logical channel used for URLLC data. Furthermore the quantity of eMBB data may be such that the communications resources associated with the configured grant are unsuitable for the transmission of the eMBB data.

Therefore, in response to receiving the eMBB data at step S604, then at step S606 the communications device 104 transmits a request 1104 for an allocation of communications resources to the infrastructure equipment 101. The request for communication resources may indicate that the resources are required for the transmission of the eMBB data identified at step S604.

Subsequently, in response to the request 1104 transmitted by the communications device 104, the infrastructure equipment 101 may transmit an indication allocation of communications resources, which may be referred to as a dynamic grant 1108. Thus at step S608 the communications device 104 receives the dynamic grant 1108 indicating the communications resources allocated for the transmission of eMBB data.

The communications resources allocated by the dynamic grant 1108 may comprise, for example, 8 PRBs for an entire timeslot (e.g. 14 OFDM symbols). The timeslot and PRBs may be those in which resources were previously allocated by means of the configured grant in step S602; in other words, there may be an overlap of some or all of the resources allocated by the dynamic grant 1108 and resources allocated by the configured grant.

At step S610, the communications device 104 determines that URLLC data is available for uplink transmission.

At step S612, the communications device 104 determines whether the communications resources allocated by the dynamic grant 1108 collide with any of the communications resources associated with the configured grant 1102. If there is no collision then control passes to step S613 in which conventional logical channel prioritisation may be applied in respect of the allocated communication resources for the transmission of the URLLC data and the eMBB data.

If, at step S612, it is determined that there is a collision between the dynamic grant and the configured grant communications resources then control passes to step S614. At step S614 it is determined whether the quantity of communication resources associated with the dynamic grant 1108 is greater than that associated with an instance of communication resources of the configured grant. If the dynamic grant resources are not greater than those of an instance of the communications resources of the configured grant, then control passes to step S615 and the URLLC data is transmitted using the resources of the configured grant in a conventional manner. If at step S614 it is determined that the dynamic grant resources are larger, then control passes to step S616 in which it is determined that the URLLC data is to be transmitted using the resources allocated by the dynamic grant.

Associated with the dynamic grant resources allocated at step S608 are encoding parameters such as parameters characterising a modulation and coding scheme (MCS) to be used by the communications device 104 for the transmission of uplink data using the communication resources of the dynamic grant. These may be indicated by the MCS indication 1110 transmitted together with the dynamic grant 1108.

At step S618, the communications device 104 determines whether the encoding parameters such as the MCS associated with the dynamic grant resources are suitable for the transmission of the URLLC data. If it is determined that they are not suitable, for example because the reliability provided by the encoding parameters is not sufficient to satisfy reliability requirements associated with the URLLC data, then control passes to step S620.

At step S620, it is determined whether the communications device 104 is permitted to select alternative encoding parameters such as a different modulation and coding scheme, for the transmission of the URLLC data. This determination may be based on, for example, an RRC configuration previously received by the communications device 104. If it is determined at step S620 that the UE is permitted to select alternative encoding parameters then control passes to step S622, in which the communications device 104 selects alternative encoding parameters suitable for the transmission of the URLLC data. As described above, in some embodiments, this may comprise selecting MCS parameters from a table, the parameters associated with an index value, where the index value is also associated (but within a different table) with the MCS parameters indicated as being associated with the DG communications resources.

If at step S618 it was determined that the MCS parameters associated with the dynamic grant resources are suitable, or it was determined at step S620 that the UE is not permitted to select alternative encoding parameters, then control passes to step S624, in which it is determined that the MCS associated with the dynamic grant communications resources is to be used for the transmission of the URLLC data. Following step S622 and step S264, control passes to step S626.

At step S626 the communications device 104 determines whether the acknowledgement information 1116 is to be transmitted together with the URLLC data 1112. This determination may be based on conventional hybrid ARQ (HARQ) protocols applicable to downlink data previously received from the infrastructure equipment 101, and may be based on a time duration between the time of receipt of the previous downlink data, and the time at which the URLLC data 1112 is to be transmitted.

If at step S626 it is determined that the acknowledgement information 1116 is to be transmitted, then control passes to step S628. In step S628, the encoding parameters such as the MCS, may be modified to permit the transmission of the acknowledgement information 1116 within the dynamic grant communications resources. For example, because the acknowledgement information is transmitted using resource elements which are 'stolen' from the PUSCH resources, it may be necessary to adapt the selected MCS such that it is possible to transmit the transport block within the remaining PUSCH resources.

Control then passes to step S630 in which a transport block is formed comprising the URLLC data 1112 and which is encoded in accordance with the encoding parameters determined at step S628, step S622, and/or step S624, as applicable.

Subsequently at step S632, the communications device 104 transmits, using the dynamic grant communications resources, the transport block encoded at step S630 comprising the URLLC data 1112, any acknowledgement information 1116 identified at step S626, and the indication 1114 of the modulation and coding scheme selected at either step S622, or step S624.

In some embodiments step S632 may comprise passing the encoded transport block together with an indication of the acknowledgement information 1116 and the selected MCS indication 1114 from the MAC layer 302 of the communications device 104 to the physical layer 308 of the communications device for transmission on the wireless access interface to the infrastructure equipment 101.

It will be appreciated that in some embodiments, the process illustrated in FIG. 12 and described above may be modified, for example, by the addition, omission, or re-ordering of one or more of the steps. For example, step S610 may occur earlier in the process (such as following step S604). One or more steps may be unnecessary (and thus omitted) in light of restrictions imposed by, or flexibility permitted by, standards specifications; for example, if it always permitted for the communications device 104 to select an alternative MCS, then step S620 may be omitted.

In accordance with some embodiments of the present disclosure, a process corresponding to that described above for the communications device 104 may be carried out by the infrastructure equipment 101 to receive and decode the uplink data. As described above, many of the determinations (such as those described at step S612, step S620 and step S626) carried out by the communications device 104 may also be carried out by the infrastructure equipment 101.

Accordingly, the infrastructure equipment 101 may, having received the signals transmitted on the uplink PUSCH resources (including any 'stolen' for the HARQ feedback 1116 and the MCS indication 1114) may determine whether HARQ feedback and/or an MCS indication is present. If the MCS indication 1114 is present, it may first decode that, and thus determine the MCS used by the communications device 104 to encode the MAC TB comprising the URLLC data 1112. Subsequently, it may, without recourse to blind decoding for the purpose of determining the MCS of the MAC TB, decode the MAC TB from the appropriate PUSCH resource elements.

As described above, the MCS indication 1114 may indicate which of a plurality of permitted MCS parameters have been selected for encoding the MAC TB comprising the URLLC data 1112.

In some embodiments the plurality of permitted MCS parameters may be indicated by the infrastructure equipment 101 to the communications device 104. For example, four permitted MCS index values may be indicated in a dedicated or broadcast manner in a downlink transmission. The MCS indication 1114 may thus comprise two bits to indicate which of the four permitted index values has been selected.

In the embodiments described above, the data transmitted on PUSCH is user data, however, the present disclosure is not so limited. For example the data part (i.e. PUSCH) may comprise RRC signalling or other MAC signalling, such as a message A of a 2-step RACH (which may broadly correspond to a message 3 in a conventional 4-step RACH).

In some embodiments, such as those illustrated in FIG. 9 and FIG. 10, the MCS indication 1114 is transmitted using PUSCH communications resources. In some embodiments, the MCS indication 1114 is transmitted using PUCCH communications resources.

In some embodiments, PUSCH transmissions are repeated to further improve the reliability (i.e. probability of successful reception and decoding). Conventionally, each iteration comprises PUSCH resource elements used for the transmission of data, and PUSCH resource elements used for DMRS, according to a predetermined pattern. Conventionally, the pattern is the same for each repeated iteration, and may be the same irrespective of the number (if any) of repetitions.

However, there is a need to further improve the efficiency with which communications resources are used. The inventors of the present disclosure have identified that the use of the same pattern of DMRS and data resource elements may result in inefficient use of communications resources.

Figure 13:
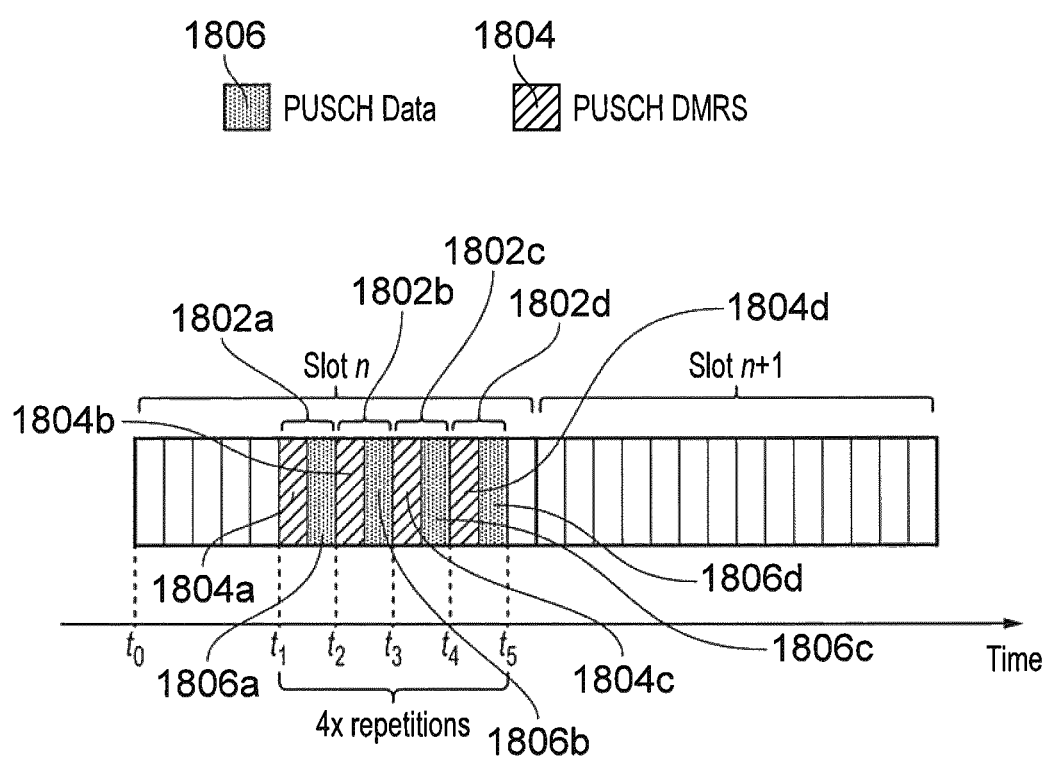
FIG. 13 illustrates a repeated PUSCH transmission in accordance with conventional techniques.

FIG. 13 illustrates a repeated PUSCH transmission in accordance with conventional techniques. In the example of FIG. 13, a PUSCH transmission over 2 OFDM symbols 1802 can be repeated 4 times 1802a 1802b, 1802c, 1802d, from time t1 to t2, t2 to t3, t3 to t4 and t4 to t5 respectively, within the allocated communications resources which extend from t1 to t5. As is typical, in the example of FIG. 13, the PUSCH transmission has a front loaded DMRS 1804a, 1804b, 1804c, 1804d, i.e. the PUSCH data 1806a, 1806b, 1806c, 1806d is preceded by a symbol of DMRS. Hence, in a PUSCH repetition where each PUSCH has short duration such as a mini-slot (2 OFDM symbols), the DMRS overhead will be high. In the example in FIG. 13, the DMRS overhead is 50% of the entire PUSCH transmission.

In some embodiments of the present technique, the communications device 104 indicates a DMRS pattern for PUSCH transmission. Accordingly, the infrastructure equipment determines which subset of the allocated resources (e.g. which OFDM symbol(s) and/or resource elements, within the allocated resources) is used for DMRS. In some embodiments, the transmission uses resources allocated by a configured grant.

In some embodiments, a DMRS pattern indicator is embedded in the PUSCH transmission in known resource elements (REs), in a similar manner as is shown in FIGS. 8 and 9 above for the MCS indication 1114.

In some embodiments, the DMRS pattern indicator may indicate the pattern of DMRS REs within a predetermined number of iterations of the repeated PUSCH transmission. In some embodiments, therefore, the DMRS pattern indicator may be included in only a subset of the iterations. For example, the DMRS pattern indicator may indicate the DMRS REs used for four iterations of the PUSCH transmission, and thus in the example of FIG. 13, only one DMRS pattern indicator would be included in the first iteration. In some embodiments, a DMRS pattern indicator is transmitted within PUSCH resources of each iteration.

The DMRS pattern indicator may indicate which of a plurality of permitted DMRS patterns have been selected by the communications device 104 and are used in one or more iterations of a repeated PUSCH transmission.

An indication of the permitted DMRS patterns may be transmitted by the infrastructure equipment 101 to the communications device 104, for example in a similar manner to an indication of permitted MCS parameters, in accordance with example embodiments described herein.

Each of the permitted DMRS patterns may be associated with an index value, and the DMRS pattern indicator may comprise an indication of the index value associated with the selected DMRS pattern.

In some embodiments, the MCS indication 1114 comprises an indication of the DMRS pattern. In some embodiments, each permitted DMRS pattern is associated, in a one-to-one manner, with a permitted MCS; thus, no additional bits are required to indicate the DMRS pattern since it is implicitly indicated by the selected MCS.

In some embodiments, the MCS indication 1114 and DMRS pattern indicator are jointly encoded and transmitted within a subset of resource elements, such as the subsets 802, 902 illustrated in FIG. 9 and FIG. 10 and described above. In some embodiments a bit pattern may be encoded within the resource elements reserved for the MCS indication 1114 which indicates both the selected MCS and the selected DMRS pattern.

Other aspects of the transmission of the MCS indication 1114 described herein may be accordingly adapted to accommodate the transmission of the DMRS pattern indicator within the scope of the present disclosure.

Thus there has been described a method of transmitting uplink data by a communications device in a wireless communications network, the method comprising receiving an indication of first communications resources allocated for a transmission of data by the communications device and associated with encoding parameters, determining that first uplink data is available for transmission, selecting the first communications resources for the transmission of the first uplink data, selecting encoding parameters different from the encoding parameters associated with the first communications resources, forming a transport block comprising the first uplink data in accordance with the selected encoding parameters, and transmitting, using the first communications resources, the transport block and an indication of the selected encoding parameters.

There has also been described a method of receiving uplink data by an infrastructure equipment in a wireless communications network, the method comprising transmitting an indication of first communications resources allocated for a transmission of data by the communications device and associated with encoding parameters, receiving, using the first communications resources, a transport block and an indication of selected encoding parameters, decoding from the transport block the uplink data in accordance with the indication of the selected encoding parameters, wherein the selecting encoding parameters are different from the encoding parameters associated with the first communications resources.

There has further been described A method of transmitting uplink data by a communications device in a wireless communications network, the method comprising determining communications resources allocated for a transmission of the uplink data by the communications device, selecting a first subset of the allocated communications resources for the transmission of demodulation reference signals (DMRS), transmitting within a second predetermined subset of the allocated communications resources an indication of the first subset of the allocated communications resources; transmitting the DMRS using the first subset of the allocated communications resources, and repeatedly transmitting the uplink data using a third subset of the allocated communications resources, the third subset not including the first subset or the second subset of the allocated communications resources.

There has also been disclosed a method of receiving uplink data transmitted by a communications device in a wireless communications network, the method comprising determining communications resources allocated for a transmission of the uplink data by the communications device, receiving signals transmitted using the allocated communications resources, determining a first subset of the allocated communications resources used for the transmission of demodulation reference signals based on an indication of the first subset of the allocated communications resources transmitted within a second predetermined subset of the allocated communications resources; decoding the uplink data from a third subset of the allocated communications resources, the third subset of the first communications resources not including either the first subset or the second subset of the allocated communications resources. It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting uplink data by a communications device in a wireless communications network, the method comprising receiving an indication of first communications resources allocated for a transmission of data by the communications device and associated with encoding parameters, determining that first uplink data is available for transmission, selecting the first communications resources for the transmission of the first uplink data, selecting encoding parameters different from the encoding parameters associated with the first communications resources, forming a transport block comprising the first uplink data in accordance with the selected encoding parameters, and transmitting, using the first communications resources, the transport block and an indication of the selected encoding parameters.

Paragraph 2. A method according to paragraph 1, the method comprising receiving an indication of second communications resources available for a transmission of data by the communications device, wherein the first communications resources comprise a portion of the second communications resources.

Paragraph 3. A method according to paragraph 2, wherein the second communications resources are periodic.

Paragraph 4. A method according to any of paragraphs 1 to 3, the method comprising determining that second uplink data is available for transmission, the second uplink data associated with a lower priority than the first uplink data, transmitting to an infrastructure equipment of the wireless communications network a request for an allocation of communications resources for the transmission of the second uplink data, wherein the indication of the first communications resources is transmitted by the infrastructure equipment in response to receiving the request for the allocation.

Paragraph 5. A method according to paragraph 4, wherein the second uplink data is associated with a requirement for a maximum permitted latency that is longer than a maximum permitted latency associated with the first uplink data.

Paragraph 6. A method according to paragraph 4 or paragraph 5, wherein the second uplink data is associated with an Enhanced Mobile Broadband service.

Paragraph 7. A method according to any of paragraphs 1 to 6, the method comprising receiving a permission indication, the permission indication indicating that the communications device may select encoding parameters different from those associated with the first communications resources.

Paragraph 8. A method according to any of paragraphs 1 to 7, wherein the selected encoding parameters are selected from a plurality of permitted encoding parameters.

Paragraph 9. A method according to paragraph 8, the method comprising determining the plurality of permitted encoding parameters based on the encoding parameters associated with the first communications resources.

Paragraph 10. A method according to any of paragraphs 1 to 9, the method comprising receiving an indication of the encoding parameters associated with the first communications resources, the indication comprising a first index value associated with a first row of a first predetermined table of encoding parameters, wherein the selected encoding parameters are selected from a second row of a second predetermined table of encoding parameters, the second row associated with a second index value, the second index value being determined from the first index value according to a predetermined rule.

Paragraph 11. A method according to paragraph 10, wherein the second index value is equal to the first index value.

Paragraph 12. A method according to paragraph 10 or paragraph 11, wherein the indication of the selected encoding parameters comprises an indication identifying the second predetermined table.

Paragraph 13. A method according to any of paragraphs 1 to 12, wherein the indication of the selected encoding parameters comprises an indication that the selected encoding parameters differ from the encoding parameters associated with the first communications resources.

14. A method according to any of paragraphs 1 to 13, the method comprising receiving downlink data, determining whether the downlink data has been decoded correctly, and determining whether acknowledgement information indicating whether the downlink data has been decoded correctly is to be transmitted using the first communications resources.

Paragraph 15. A method according to paragraph 14, the method comprising if the acknowledgement information is to be transmitted using the first communications resources, transmitting the acknowledgement information using a first predetermined subset of the first communications resources, and wherein transmitting, using the first communications resources, the indication of the selected encoding parameters comprises transmitting the indication of the selected encoding parameters using a second predetermined subset of the first communications resources.

Paragraph 16. A method according to paragraph 15, wherein if the acknowledgement information is not to be transmitted using the first communications resources, then transmitting, using the first communications resources, the indication of the selected encoding parameters comprises transmitting the indication of the selected encoding parameters using the first predetermined subset of the first communications resources Paragraph 17. A method according to paragraph 14 or paragraph 15, the method comprising before forming the transport block, adapting the selected encoding parameters to permit the transport block, the indication of the selected encoding parameters and the acknowledgement information to be transmitted using the first communications resources.

Paragraph 18. A method according to any of paragraphs 1 to 17, wherein the indication of the selected encoding parameters is transmitted using a predetermined subset of the first communications resources and is encoded to permit decoding independently of a decoding of the transport block.

Paragraph 19. A method according to any of paragraphs 1 to 18, wherein the indication of the selected encoding parameters is transmitted using a predetermined modulation scheme.

Paragraph 20. A method according to paragraph 19, wherein the predetermined modulation scheme is quadrature phase shift keying (QPSK).

Paragraph 21. A method according to any of paragraphs 1 to 20, wherein the indication of the first communications resources comprises an indication of the encoding parameters associated with the first communications resources.

Paragraph 22. A method according to any of paragraphs 1 to 21 wherein the first communications resources comprise physical uplink shared channel (PUSCH) resources.

Paragraph 23. A method according to any of paragraphs 1 to 22 wherein receiving the indication of the first communications resources comprises receiving downlink control information (DCI) comprising an indication of the first communications resources and an indication of the encoding parameters associated with the first communications resources.

Paragraph 24. A method of receiving uplink data by an infrastructure equipment in a wireless communications network, the method comprising transmitting an indication of first communications resources allocated for a transmission of data by the communications device and associated with encoding parameters, receiving, using the first communications resources, a transport block and an indication of selected encoding parameters, decoding from the transport block the uplink data in accordance with the indication of the selected encoding parameters, wherein the selecting encoding parameters are different from the encoding parameters associated with the first communications resources.

Paragraph 25. A method according to paragraph 24, the method comprising transmitting an indication of second communications resources available for a transmission of data by a communications device, wherein the first communications resources comprise a portion of the second communications resources Paragraph 26. A method of transmitting uplink data by a communications device in a wireless communications network, the method comprising determining communications resources allocated for a transmission of the uplink data by the communications device, selecting a first subset of the allocated communications resources for the transmission of demodulation reference signals (DMRS), transmitting within a second predetermined subset of the allocated communications resources an indication of the first subset of the allocated communications resources; transmitting the DMRS using the first subset of the allocated communications resources, and repeatedly transmitting the uplink data using a third subset of the allocated communications resources, the third subset not including the first subset or the second subset of the allocated communications resources.

Paragraph 27. A method according to paragraph 26, the method comprising receiving an indication of the communications resources allocated for the transmission of the uplink data, the communications resources associated with encoding parameters, selecting encoding parameters different from the encoding parameters associated with the communications resources, transmitting within the second predetermined subset of the communications resources an indication of the selected encoding parameters, wherein the repeatedly transmitting the uplink data comprises transmitting the uplink data using the selected encoding parameters.

Paragraph 28. A method according to paragraph 26 or paragraph 27, wherein the determining the communications resources allocated for the transmission of the uplink data by the communications device comprises receiving a configured grant of communications resources including the allocated communications resources.

Paragraph 29. A method according to any of paragraphs 26 to 28, wherein the first subset of the allocated communications resources is selected from a plurality of predetermined permitted subsets.

Paragraph 30. A method of receiving uplink data transmitted by a communications device in a wireless communications network, the method comprising determining communications resources allocated for a transmission of the uplink data by the communications device, receiving signals transmitted using the allocated communications resources, determining a first subset of the allocated communications resources used for the transmission of demodulation reference signals based on an indication of the first subset of the allocated communications resources transmitted within a second predetermined subset of the allocated communications resources; decoding the uplink data from a third subset of the allocated communications resources, the third subset of the first communications resources not including either the first subset or the second subset of the allocated communications resources.

Paragraph 31. A method according to paragraph 31, wherein the uplink data is repeatedly transmitted using the third subset of the allocated communications resources.

Paragraph 32. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to receive an indication of first communications resources allocated for a transmission of data by the communications device and associated with encoding parameters, to determine that first uplink data is available for transmission, to select the first communications resources for the transmission of the first uplink data, to select encoding parameters different from the encoding parameters associated with the first communications resources, to form a transport block comprising the first uplink data in accordance with the selected encoding parameters, and to transmit, using the first communications resources, the transport block and an indication of the selected encoding parameters.

Paragraph 33. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive an indication of first communications resources allocated for a transmission of data by the communications device and associated with encoding parameters, to determine that first uplink data is available for transmission, to select the first communications resources for the transmission of the first uplink data, to select encoding parameters different from the encoding parameters associated with the first communications resources, to form a transport block comprising the first uplink data in accordance with the selected encoding parameters, and to transmit, using the first communications resources, the transport block and an indication of the selected encoding parameters.

Paragraph 34. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit an indication of first communications resources allocated for a transmission of data by the communications device and associated with encoding parameters, to receive, using the first communications resources, a transport block and an indication of selected encoding parameters, to decode from the transport block the uplink data in accordance with the indication of the selected encoding parameters, wherein the selecting encoding parameters are different from the encoding parameters associated with the first communications resources.

Paragraph 35. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit an indication of first communications resources allocated for a transmission of data by the communications device and associated with encoding parameters, to receive, using the first communications resources, a transport block and an indication of selected encoding parameters, to decode from the transport block the uplink data in accordance with the indication of the selected encoding parameters, wherein the selecting encoding parameters are different from the encoding parameters associated with the first communications resources.

Paragraph 36. A communications device for use in a wireless communications network, the wireless communications network comprising an infrastructure equipment providing a wireless access interface, the communications device comprising a transmitter configured to transmit uplink data via the wireless access interface, a receiver configured to receive signals, and a controller configured to control the transmitter and the receiver so that the communications device is operable: to determine communications resources allocated for a transmission of the uplink data by the communications device, to select a first subset of the allocated communications resources for the transmission of demodulation reference signals (DMRS), to transmit within a second predetermined subset of the allocated communications resources an indication of the first subset of the allocated communications resources; to transmit the DMRS using the first subset of the allocated communications resources, and to repeatedly transmit the uplink data using a third subset of the allocated communications resources, the third subset not including the first subset or the second subset of the allocated communications resources.

Paragraph 37. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to determine communications resources allocated for a transmission of the uplink data by the communications device, to select a first subset of the allocated communications resources for the transmission of demodulation reference signals (DMRS), to transmit within a second predetermined subset of the allocated communications resources an indication of the first subset of the allocated communications resources; to transmit the DMRS using the first subset of the allocated communications resources, and to repeatedly transmit the uplink data using a third subset of the allocated communications resources, the third subset not including the first subset or the second subset of the allocated communications resources.

Paragraph 38. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to determine communications resources allocated for a transmission of the uplink data by the communications device, to receive signals transmitted using the allocated communications resources, to determine a first subset of the allocated communications resources used for the transmission of demodulation reference signals based on an indication of the first subset of the allocated communications resources transmitted within a second predetermined subset of the allocated communications resources; to decode the uplink data from a third subset of the allocated communications resources, the third subset of the first communications resources not including either the first subset or the second subset of the allocated communications resources.

Paragraph 39. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to determine communications resources allocated for a transmission of the uplink data by the communications device, to receive signals transmitted using the allocated communications resources, to determine a first subset of the allocated communications resources used for the transmission of demodulation reference signals based on an indication of the first subset of the allocated communications resources transmitted within a second predetermined subset of the allocated communications resources; to decode the uplink data from a third subset of the allocated communications resources, the third subset of the first communications resources not including either the first subset or the second subset of the allocated communications resources.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] RP-182090, "Revised SID: Study on NR Industrial Internet of Things (IoT)," RAN #81.
[2] Holma H. and Toskala A, "LTE for UMTS OFDMA and SC-FDMA based radio access", John Wiley and Sons, 2009
[3] 3GPP TS 38.321, "Medium Access Control (MAC) protocol specification (Rel-15)", v15.3.0
[4] Co-pending European patent application EP18197373.6
[5] 3GPP TS 38.214 "NR; Physical layer procedures for data (Release 15)", version 15.2.0
[6] R2-1818795, "LS on Intra-UE Prioritization/Multiplexing," RAN2, RAN2 #104
[7] RP-182089, "New SID on Physical Layer Enhancements for NR Ultra-Reliable and Low Latency Communication (URLLC)," RAN #81.

[8] 3GPP TR 38.824, "Study on physical layer enhancements for NR ultra-reliable and low latency case (URLLC) (Rel-16)," v1.0.0
[9] 3GPP TS 38.300 v. 15.2.0 "NR; NR and NG-RAN Overall Description; Stage 2 (Release 15)", June 2018
[10] 3GPP TS 38.825
[11] R2-1818991, "LS on multiple active configured grant configurations", RAN2 #104.

ANNEX 1

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIG. 15.

Figure 14:
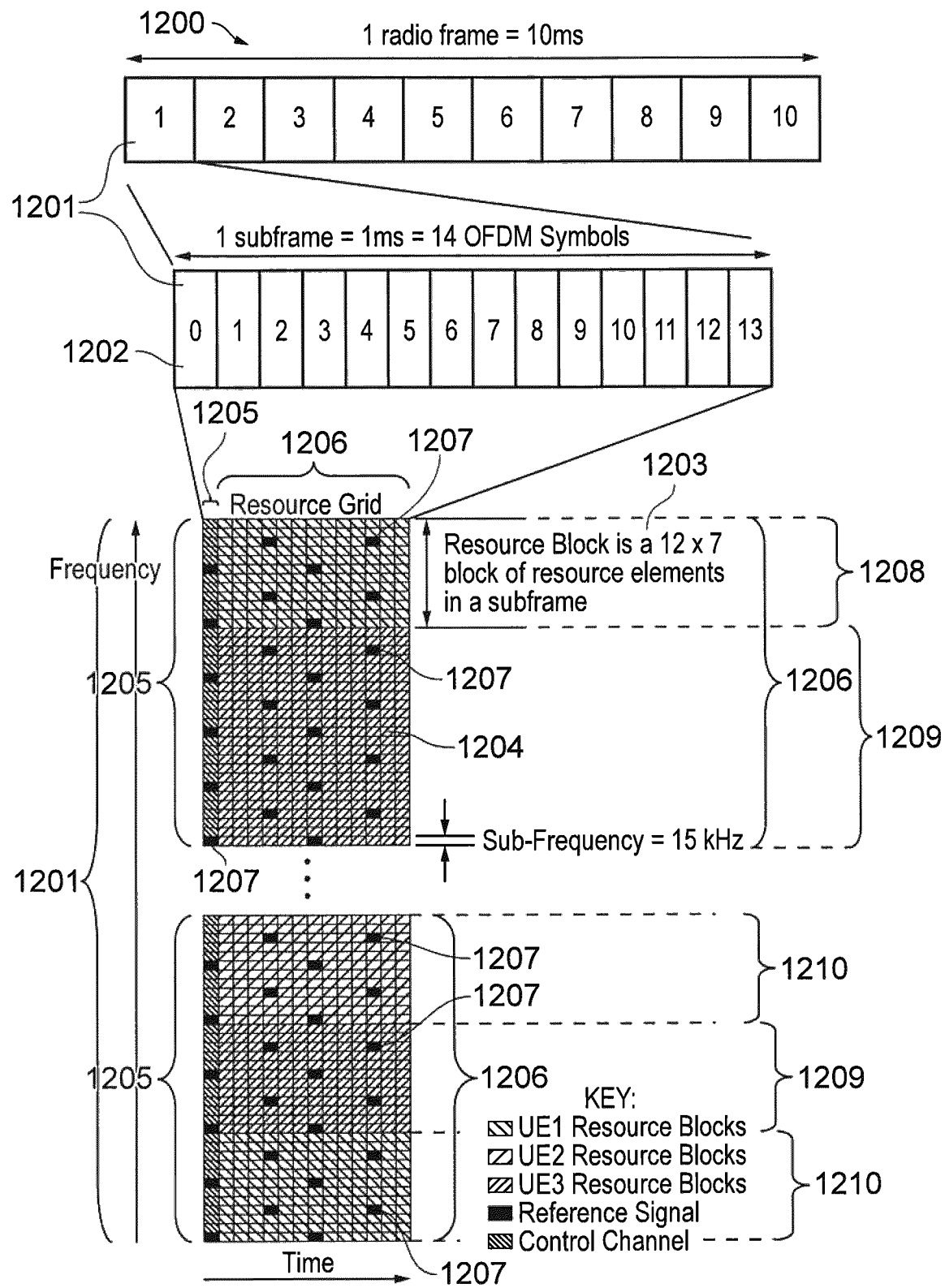
FIG. 14 is a schematic representation of a downlink of a wireless access interface according to the 3GPP LTE standard.

FIG. 14 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 14, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 15, also includes an illustration of each sub-frame 1201, which comprises a control region 1205 for the transmission of control data, a data region 1206 for the transmission of user data and reference signals 207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 15, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 15 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 15 illustrates such an uplink frame in an FDD implementation. A frame 1300 is divided into 10 sub-frames 1301 of 1 ms duration where each sub-frame 1301 comprises two slots 1302 of 0.5 ms duration. Each slot 1302 is then formed from seven OFDM symbols 1303 where a cyclic prefix 1304 is inserted between each symbol in a manner equivalent to that in downlink sub-frames.

As shown in FIG. 15, each LTE uplink sub-frame may include a plurality of different channels, for example a physical uplink communications channel (PUSCH) 1305, a physical uplink control channel (PUCCH) 1306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 1307 and sounding reference signals (SRS) 1308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in W.

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 1309 and lower 1310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:

1. A method of transmitting uplink data by a communications device in a wireless communications network, the method comprising:
   receiving an indication of first communications resources allocated for a transmission of data by the communications device and associated with encoding parameters,
   determining that first uplink data is available for transmission,
   selecting the first communications resources for the transmission of the first uplink data,
   selecting encoding parameters different from the encoding parameters associated with the first communications resources,
   forming a transport block comprising the first uplink data in accordance with the selected encoding parameters, and
   transmitting, using the first communications resources, the transport block and an indication of the selected encoding parameters, the indication of the selected encoding parameters being transmitted as one bit in hybrid automatic repeat request (HARQ) feedback, the method further comprising:
   receiving an indication of the encoding parameters associated with the first communications resources, the indication of the encoding parameters comprising a first index value associated with a first row of a first predetermined table of encoding parameters, wherein
   the selected encoding parameters are selected from a second row of a second predetermined table of encoding parameters, the second row associated with a second index value, the second index value being determined from the first index value according to a predetermined rule.

2. The method according to claim 1, the method comprising:
   receiving an indication of second communications resources available for a transmission of data by the communications device,
   wherein the first communications resources comprise a portion of the second communications resources.

3. The method according to claim 2, wherein the second communications resources are periodic.

4. The method according to claim 1, the method comprising:
   determining that second uplink data is available for transmission, the second uplink data associated with a lower priority than the first uplink data, transmitting to an infrastructure equipment of the wireless communications network a request for an allocation of communications resources for the transmission of the second uplink data, wherein the indication of the first communications resources is transmitted by the infrastructure equipment in response to receiving the request for the allocation.

5. The method according to claim 4, wherein the second uplink data is associated with a requirement for a maximum permitted latency that is longer than a maximum permitted latency associated with the first uplink data.

6. The method according to claim 4, wherein the second uplink data is associated with an Enhanced Mobile Broadband service.

7. The method according to claim 1, the method comprising:

receiving a permission indication, the permission indication indicating that the communications device may select encoding parameters different from those associated with the first communications resources.

8. The method according to claim 1, wherein the selected encoding parameters are selected from a plurality of permitted encoding parameters.

9. The method according to claim 8, the method comprising:

determining the plurality of permitted encoding parameters based on the encoding parameters associated with the first communications resources.

10. The method according to claim 1, wherein the indication of the selected encoding parameters comprises an indication that the selected encoding parameters differ from the encoding parameters associated with the first communications resources.

11. The method according to claim 1, the method comprising:

receiving downlink data,
determining whether the downlink data has been decoded correctly, and
determining whether acknowledgement information indicating whether the downlink data has been decoded correctly is to be transmitted using the first communications resources.

12. A method of receiving uplink data by an infrastructure equipment in a wireless communications network, the method comprising:

transmitting an indication of first communications resources allocated for a transmission of data by a communications device and associated with encoding parameters, receiving, using the first communications resources, a transport block and an indication of selected encoding parameters, decoding from the transport block the uplink data in accordance with the indication of the selected encoding parameters, wherein the selecting encoding parameters are different from the encoding parameters associated with the first communications resources, and the indication of the selected encoding parameters is transmitted as one bit in hybrid automatic repeat request (HARQ) feedback, and the indication of the encoding parameters includes a first index value associated with a first row of a first predetermined table of encoding parameters, and the encoding parameters are selected from a second row of a second predetermined table of encoding parameters, the second row associated with a second index value, the second index value being determined from the first index value according to a predetermined rule.

13. The method according to claim 12, the method comprising:

transmitting an indication of second communications resources available for a transmission of data by a communications device, wherein the first communications resources comprise a portion of the second communications resources.

* * * * *